US012255497B2

(12) United States Patent
Corcoran et al.

(10) Patent No.: US 12,255,497 B2
(45) Date of Patent: Mar. 18, 2025

(54) RETENTION CAP FOR PERMANENT MAGNET ROTOR

(71) Applicant: Nidec Motor Corporation, St. Louis, MO (US)

(72) Inventors: Marc J. Corcoran, St. Charles, MO (US); Jeffrey Scott Sherman, Creve Coeur, MO (US); Daniel E. Bailey, Ballwin, MO (US); Chetan O. Modi, Valley Park, MO (US); John H. Hussey, St. Louis, MO (US)

(73) Assignee: Nidec Motor Corporation, St. Louis, MO (US)

( * ) Notice: Subject to any disclaimer, the term of this patent is extended or adjusted under 35 U.S.C. 154(b) by 242 days.

(21) Appl. No.: 18/051,347

(22) Filed: Oct. 31, 2022

(65) Prior Publication Data
US 2023/0140075 A1     May 4, 2023

Related U.S. Application Data

(60) Provisional application No. 63/275,249, filed on Nov. 3, 2021.

(51) Int. Cl.
*H02K 1/28*     (2006.01)
*H02K 1/276*     (2022.01)

(52) U.S. Cl.
CPC .............. *H02K 1/28* (2013.01); *H02K 1/2773* (2013.01)

(58) Field of Classification Search
CPC .............................. H02K 1/28; H02K 1/2773
See application file for complete search history.

(56) References Cited

U.S. PATENT DOCUMENTS

2011/0037340 A1 *   2/2011   Tou ......................... H02K 7/003
                                                      29/598

FOREIGN PATENT DOCUMENTS

WO    WO-2018163319 A1 *   9/2018    ............... H02K 1/27
WO    WO-2019003802 A1 *   1/2019    ............... H02K 1/27

* cited by examiner

*Primary Examiner* — Terrance L Kenerly
(74) *Attorney, Agent, or Firm* — Hovey Williams LLP

(57) ABSTRACT

A rotor for an electric motor includes a core, a plurality of magnets, and a magnet retention cap. The core is rotatable about an axis and defines a plurality of magnet-receiving slots. Each of the magnets is received in a respective one of the magnet-receiving slots. The magnet retention cap is fixed relative to the core and includes a resiliently deformable magnet retention element configured to restrict axial movement of the magnets relative to the core.

20 Claims, 10 Drawing Sheets

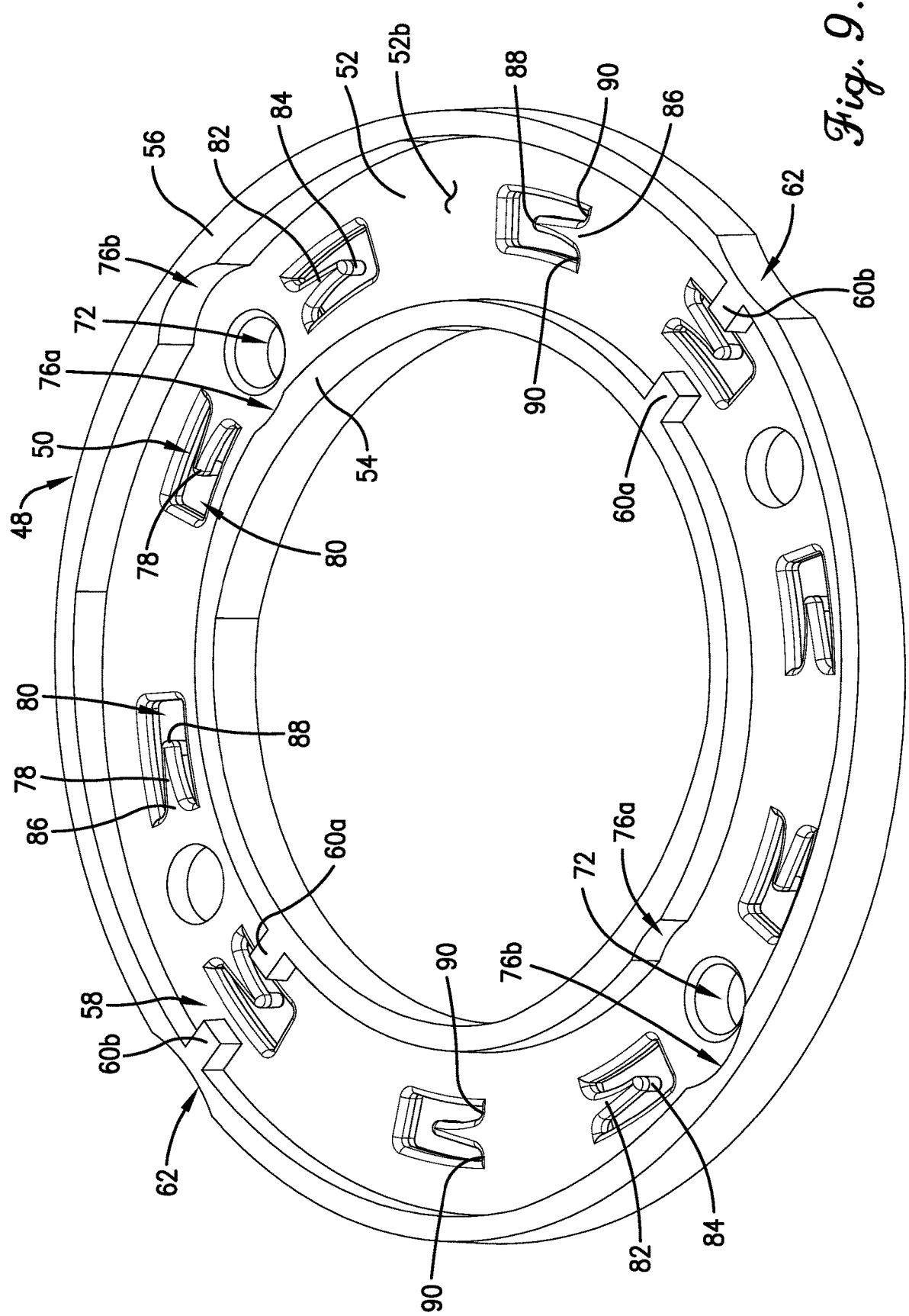

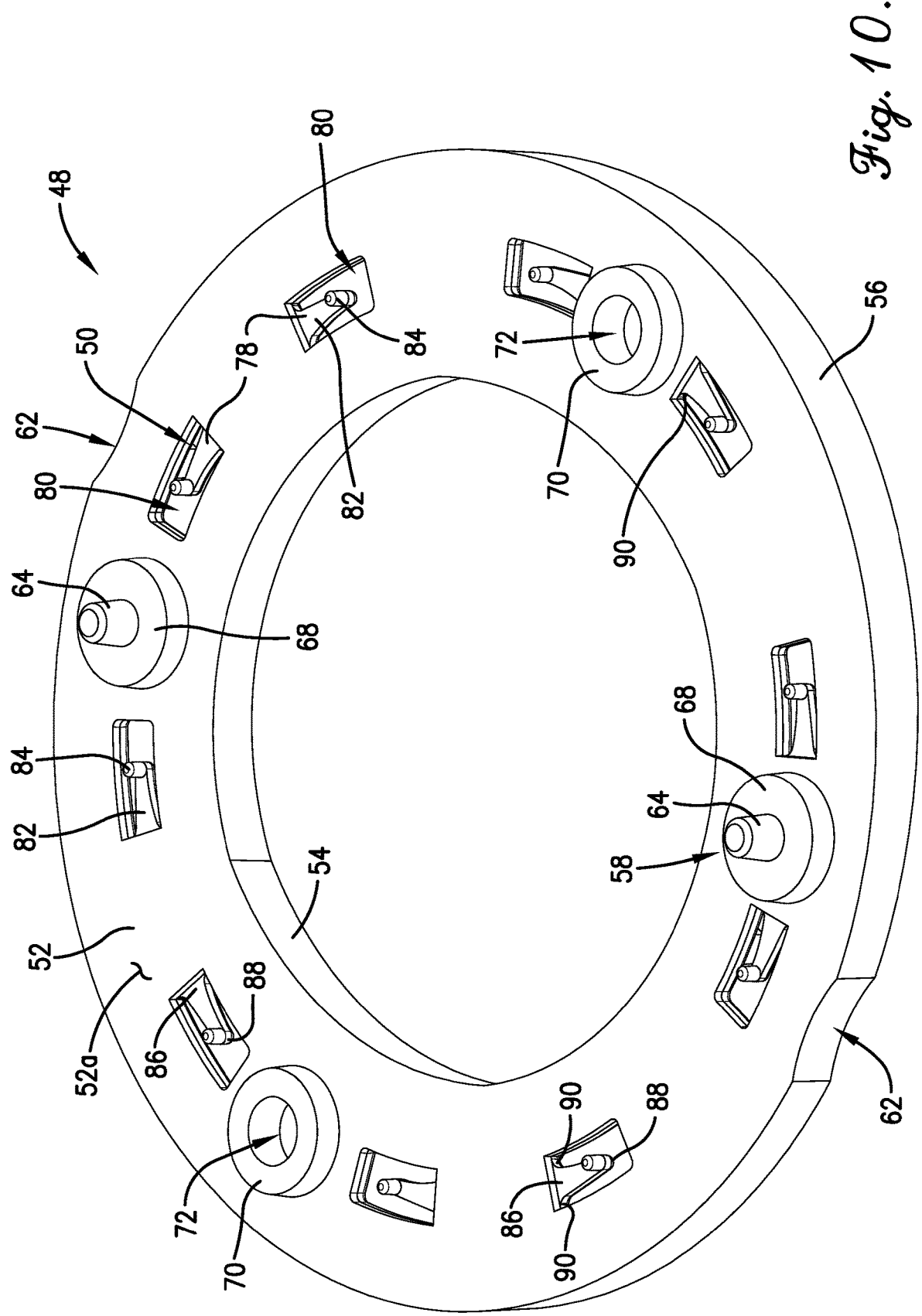

RETENTION CAP FOR PERMANENT MAGNET ROTOR

CROSS-REFERENCE TO RELATED APPLICATION

1. Priority Application

The present application claims the benefit of and priority from U.S. Provisional Patent Application No. 63/257,249, filed Nov. 3, 2021, the entire disclosure of which is hereby incorporated by reference herein.

BACKGROUND OF THE INVENTION

1. Field of the Invention

The embodiments described herein relate generally to a rotor for an electric motor. More particularly, embodiments of the present invention concern rotor assemblies having rotor cores with permanent magnets disposed therein.

2. Discussion of the Prior Art

Permanent magnets are often used in rotors of electronically controlled motors. These magnets are often placed in openings or slots defined in laminated rotor cores at predetermined positions for best motor performance. The magnets must be retained in the rotor core to prevent movement thereof during motor operation and shipping and handling. This is conventionally achieved through any one or more of a variety of techniques. For instance, high strength adhesive might be applied between the rotor core and magnets. However, in addition to the cost associated with adhesives, adhesives require additional processing such as cleaning the parts for proper adhesion, adhesive curing equipment, and time to develop the proper bond strength. Overmolding and other processes requiring heat can de-magnetize or reduce magnet strength, reducing motor performance and/or necessitating post-assembly magnetization, and may require collaboration with third-party vendors. Overmolding is also particularly challenging when rotor cores are fluffy or spongy. Shrink wrap leads to cost and performance issues to due a large air gap requirement. Press fitting of magnets into the core may require servo presses and also may result in tolerance stack up issues.

Rotor core designs featuring inbuilt or integral magnet retention structures may also be used. For instance, rotor cores may include laminations having integral projections that generate mechanical interference with magnets to retain the magnets via friction. However, such laminated rotors are susceptible to manufacturing variations in the size of the laminations and magnets.

SUMMARY

According to one aspect of the present invention, a rotor for an electric motor includes a core rotatable about an axis and defining a plurality of magnet-receiving slots; a plurality of magnets, each of the magnets being received in a respective one of the magnet-receiving slots; and a magnet retention cap fixed relative to the core and including a resiliently deformable magnet retention element configured to restrict axial movement of the magnets relative to the core.

This summary is provided to introduce a selection of concepts in a simplified form. These concepts are further described below in the detailed description of the preferred embodiments.

Various other aspects and advantages of the present invention will be apparent from the following detailed description of the preferred embodiments and the accompanying drawing figures.

BRIEF DESCRIPTION OF THE DRAWINGS

Preferred embodiments of the present invention are described in detail below with reference to the attached drawing figures, wherein:

FIG. 9 is an enlarged front perspective view of the magnet retention cap of the rotor of FIGS. 1-8; and FIG. 10 is a rear perspective view of the magnet retention cap of FIG. 9.

Figure 1:
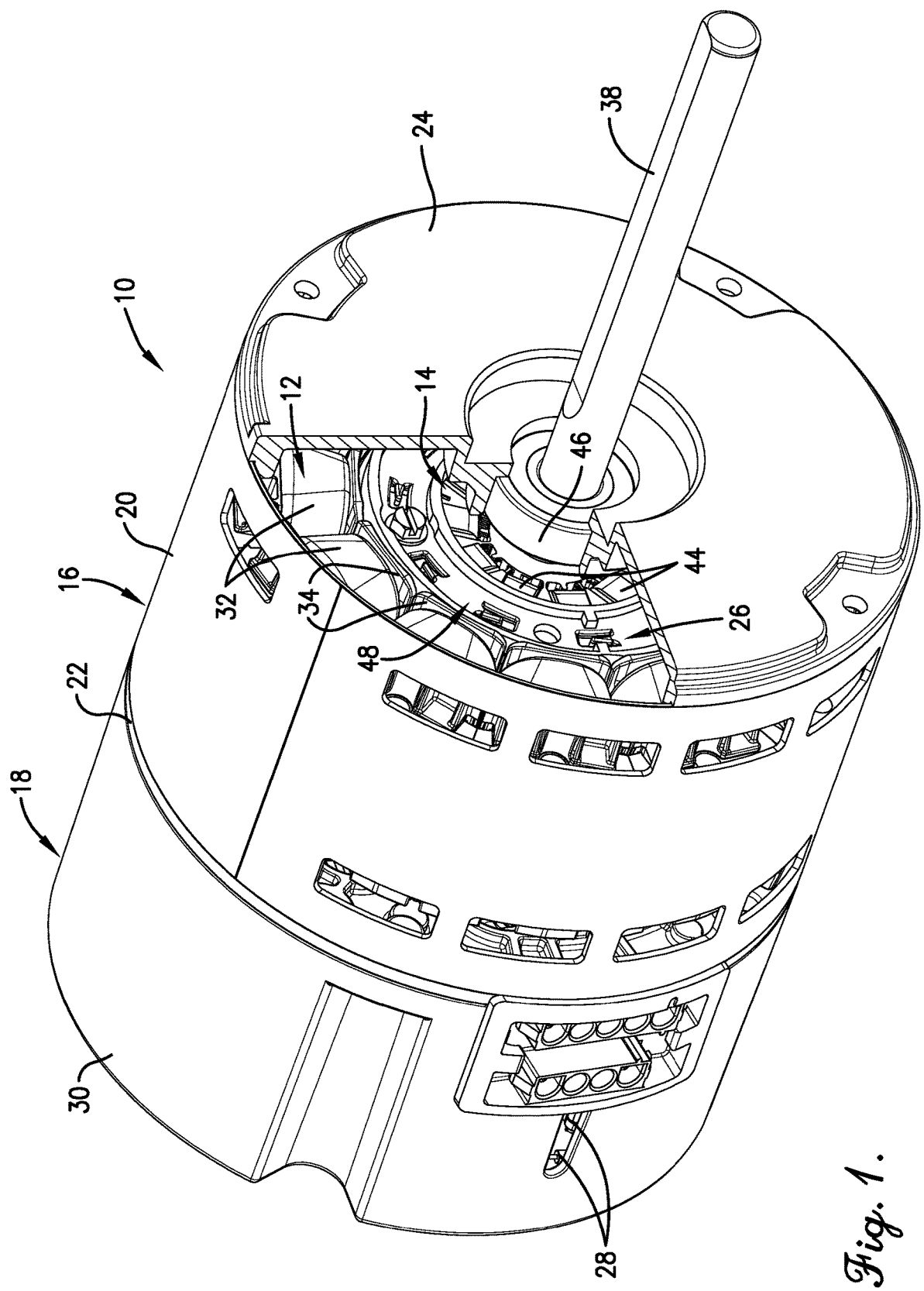
FIG. 1 is a perspective view of a motor in accordance with a preferred embodiment of the present invention, wherein an endcap of the motor is partially sectioned to expose a magnet retention cap.
Figure 2:
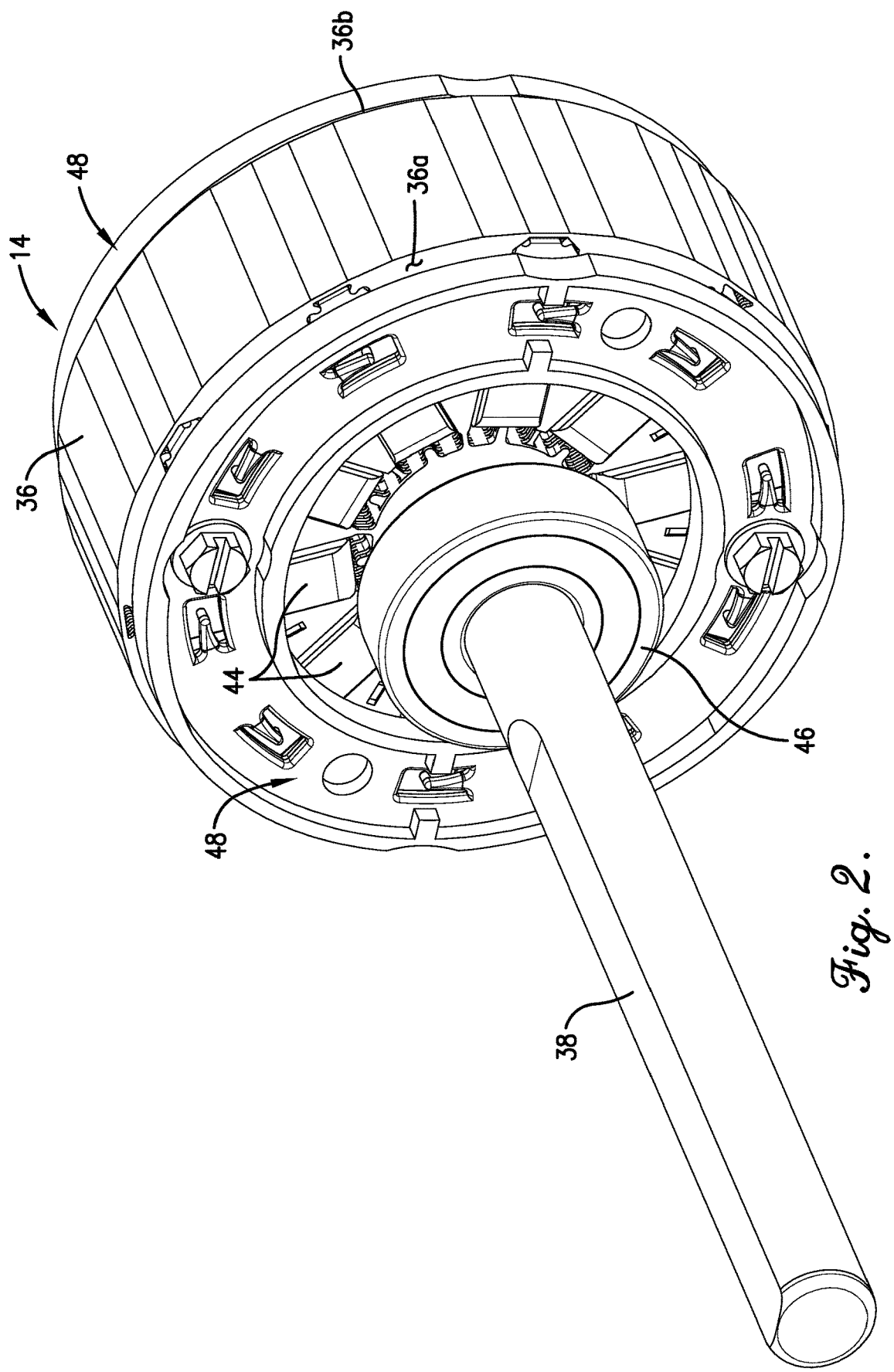
FIG. 2 is an alternate perspective view of the rotor of the motor of FIG. 1.
Figure 3:
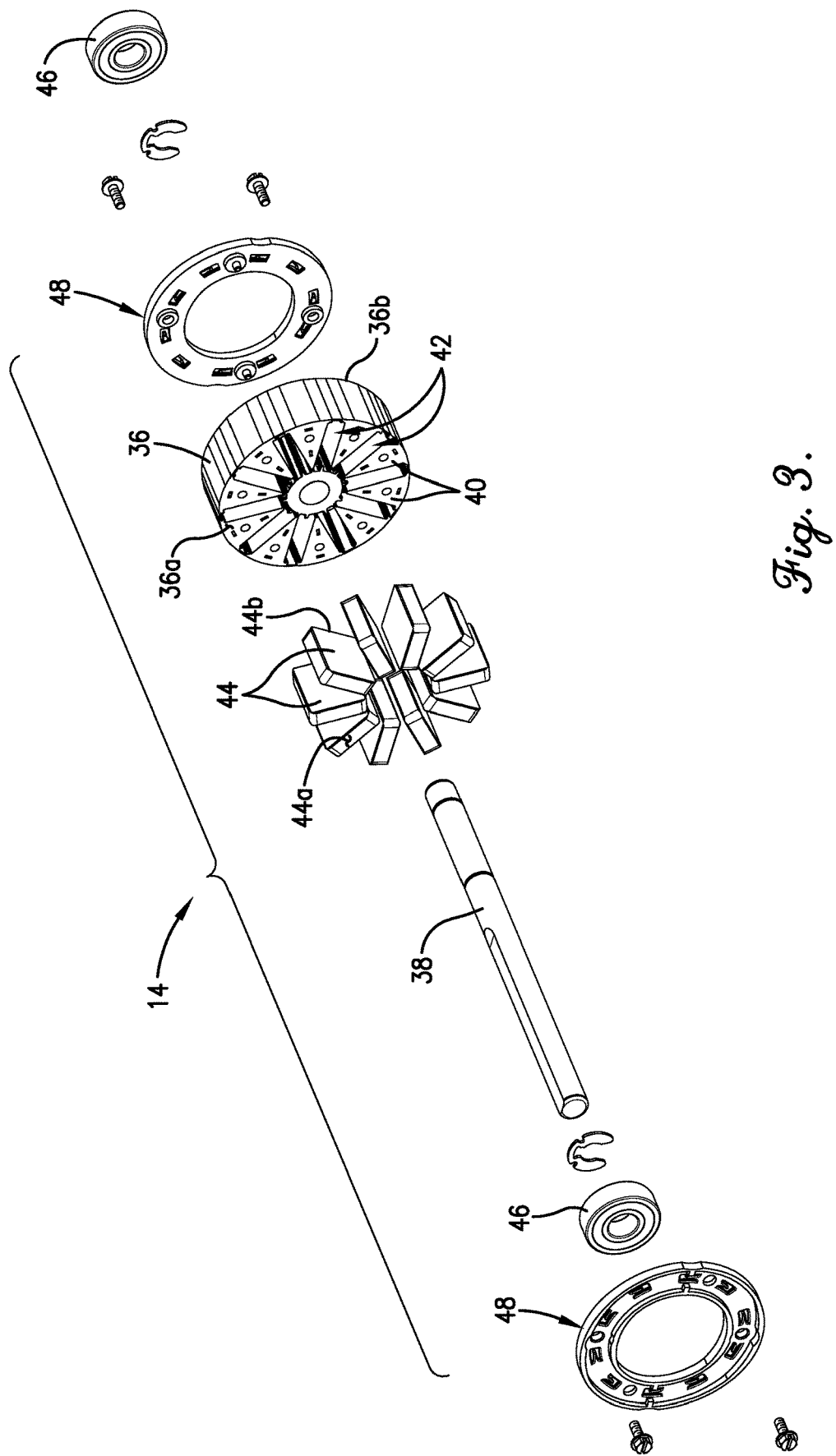
FIG. 3 is an exploded perspective view of the rotor of FIG. 2.
Figure 4:
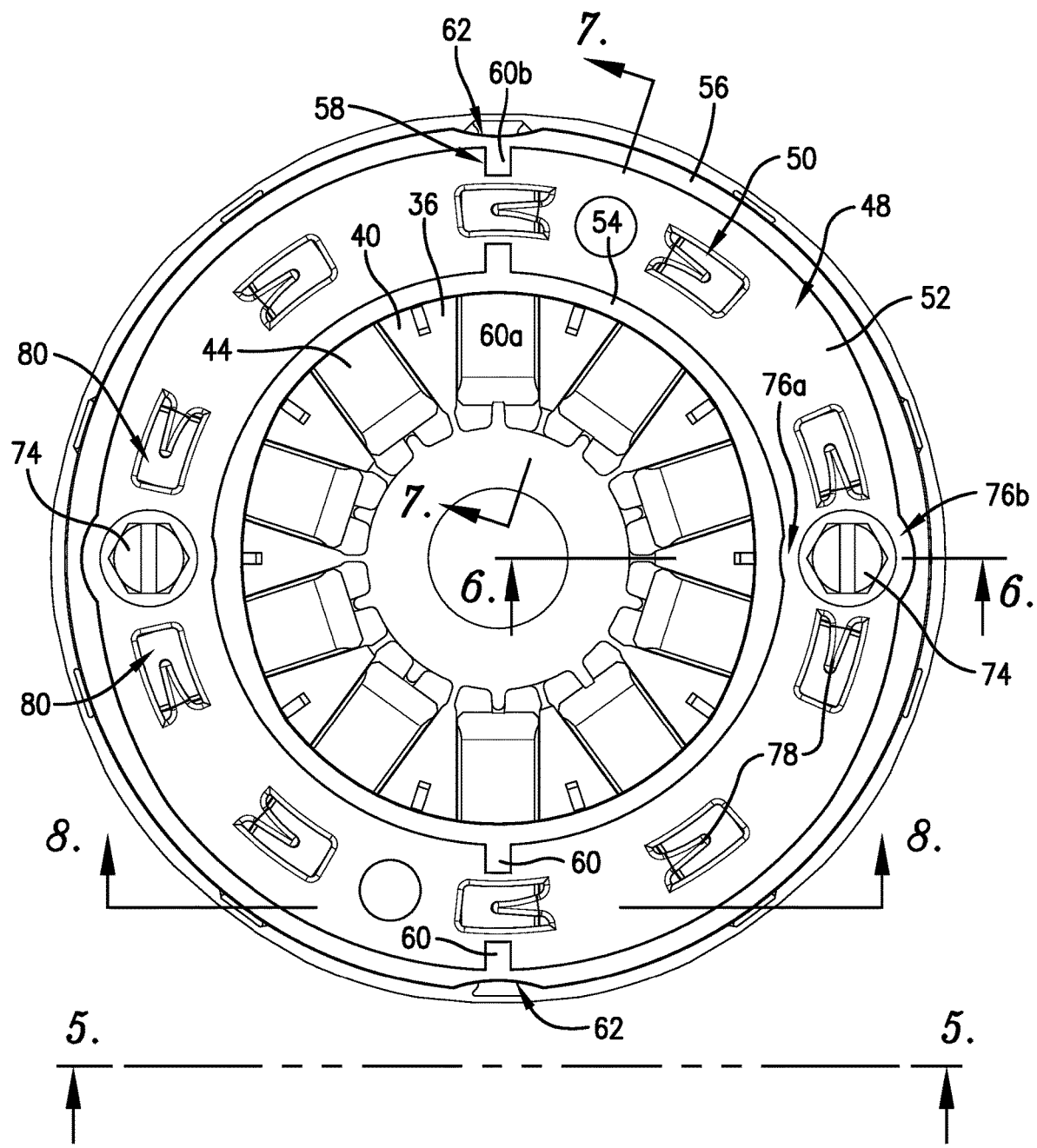
FIG. 4 is a front view of the rotor of FIG. 2, with the shaft and bearings removed.

The drawing figures do not limit the present invention to the specific embodiments disclosed and described herein. While the drawings do not necessarily provide exact dimensions or tolerances for the illustrated structures or components, the drawings are to scale with respect to the relationships between the components of the structures illustrated in the drawings.

DETAILED DESCRIPTION

The present invention is susceptible of embodiment in many different forms. While the drawings illustrate, and the specification describes, certain preferred embodiments of the invention, it is to be understood that such disclosure is by way of example only. There is no intent to limit the principles of the present invention to the particular disclosed embodiments.

Furthermore, unless specified or made clear, the directional references made herein with regard to the present invention and/or associated components (such as top, bottom, upper, lower, inner, outer, and so on.) are used solely for the sake of convenience and should be understood only in relation to each other. For instance, a component might in practice be oriented such that faces referred to as "top" and "bottom" are sideways, angled, inverted, and so on relative to the chosen frame of reference.

Motor Overview

FIG. 1 illustrates an electric motor 10 in accordance with a preferred embodiment of the present invention. The motor 10 broadly includes a stator 12 and a rotor 14. The rotor 14 rotates relative to the stator 12 about an axis of rotation.

The motor 10 further includes a motor housing 16 and a controller assembly 18. The motor housing 16 includes an outer shell 20 and a pair of axially opposed endshields 22 and 24. The housing 16 defines a motor chamber 26 in which the stator 12 and the rotor 14 are at least substantially received.

The controller assembly 18 preferably includes electronic components 28 for controlling operation of the motor 10. The controller assembly 18 further preferably includes a controller housing 30 secured to the motor housing 16 and at least in part enclosing the electronic components 28.

The stator 12 is generally toroidal in form and defines a stator axis that is coaxial with the axis of rotation of the rotor 14. However, according to some aspects of the present invention, it is permissible for the axes to be non-coaxial. The stator 12 preferably includes a stator core (not shown) and a plurality of coils 32 wound about the stator core. In the illustrated embodiment, the stator 12 further includes a plurality of electrically insulative coverings 34 positioned between the stator core and the coils 32.

In the exemplary embodiment, the electric motor 10 is an inner rotor motor, with the stator 12 circumscribing the rotor 14. However, according to some aspects of the present invention, the electric motor may alternately be an outer rotor motor or dual rotor motor.

In a preferred embodiment of the present invention, the rotor 14 includes a rotor core 36 and a rotor shaft 38 to which the rotor core 36 is mounted.

The rotor core 36 includes a plurality of arcuately arranged pole segments 40 and defines a plurality of axially extending, arcuately spaced apart magnet-receiving slots 42. The slots 42 preferably alternate arcuately with the pole segments 40.

The rotor 14 further preferably includes a plurality of magnets 44, each of which is received in a respective one of the magnet-receiving slots 42.

The magnets 44 are preferably permanent magnets and may comprise ferrite, neodymium, and/or other materials suited for accomplishing the desired motor performance.

It is noted that, according to certain aspects of the present invention, the rotor core may be constructed for use in an electric generator or other electric machine that includes a stator, in contrast to use in a motor, as illustrated.

The rotor core 36 is preferably generally cylindrical in form and, in a preferred embodiment, is fabricated from steel. Other materials are permissible according to some aspects of the present invention, however.

The rotor core 36 may be of either solid or laminated construction according to some aspects of the present invention, although laminated construction is preferred and illustrated. Furthermore, the rotor core may also be segmented in form, although non-segmented construction is illustrated and preferred.

Detailed descriptions of a preferred rotor construction are provided in U.S. patent application Ser. No. 17/167,873, filed Feb. 4, 2021, and entitled "LAMINATED SPOKED ROTOR WITH MECHANICAL MAGNET RETENTION," and U.S. Provisional Patent Application Ser. No. 62/970,031, filed Feb. 4, 2020, also entitled "LAMINATED SPOKED ROTOR WITH MECHANICAL MAGNET RETENTION" and from which the '873 application claims priority. The '873 application and the '031 application are incorporated by reference herein in their entireties.

The electric motor 10 further preferably includes first and second bearing assemblies 46 that cooperatively rotatably support the rotor shaft 38 of the rotor 14. The endshields 22 and 24 support respective ones of the bearing assemblies 46. Alternative or additional bearing assembly supports may be provided without departing from the scope of the present invention, however.

The rotor 14 further includes a pair of magnet retention caps 48, each of which includes a resiliently deformable magnet retention element 50 configured to restrict axial movement of the magnets 44 relative to the core 36.

The retention caps 48 are positioned on respective axial ends of the rotor core 36 and fixed relative thereto. Furthermore, the retention caps 48 are preferably identical to one another. However, it is permissible according to some aspects of the present invention for only a single retention cap to be provided or for the retention caps associated with a given motor to vary from each other substantially or insubstantially.

It is further noted that the illustrated retention element 50 of each cap 48 is configured to restrict movement of all the magnets 44; however, according to certain aspects of the present invention, one or both of the retention elements may alternatively be configured to restrict movement of less than all of the magnets.

Magnet Retention Cap Structure

As noted above, the retention caps 48 are preferably identical to each other. Therefore, for purposes of clarity and conciseness, a single one of the retention caps 48 will be described below. The descriptions below show be understood to apply to both of the end caps 48, however.

The magnet retention cap 48 is preferably generally toroidal in form and extends circumferentially continuously along a circular path. Although discontinuities and/or non-circular extension fall within the scope of some aspects of the present invention, it is generally desirable that the rotor core 36 and the cap 48 have generally complementary shapes and that discontinuities or openings in the cap 48 are generally minimized except as noted below.

Furthermore, the cap 48 preferably presents an outer diameter slightly less than or equal to the outer diameter of the rotor core 36. Still further, the cap 48 preferably presents an inner diameter that is greater than that of the rotor core 36. In this manner, the cap 48 does not increase the outer radial dimensions of the rotor 14 as a whole or decrease the inner radial dimensions of the rotor 14 as a whole. Thus, the cap 48 does not interfere with any components radially adjacent the rotor 14.

The cap 48 preferably includes a radially and circumferentially extending body 52 and radially spaced apart inner and outer walls 54 and 56, respectively, extending from the body 52.

The walls 54 and 56 preferably extend circumferentially, and concentrically in relation to each other. Furthermore, the walls 54 and 56 preferably project orthogonally or at least substantially orthogonally from the body 52 (or axially or at least substantially axially relative to the rotational axis of the rotor core 36), although shape and projection angle variations fall within the scope of some aspects of the present invention. Alternatively described, the walls 54 and 56 preferably extend axially away from the core 36.

It is permissible according to some aspects of the present invention for either or both of the walls to be omitted entirely.

In a preferred embodiment, the body 52 presents an inner surface 52a and an axially opposed outer surface 52b. The walls 54 and 56 project from the outer surface 52b.

The outer wall 56 and the inner wall 54 each preferably vary arcuately in height. More particularly, the inner wall 54 has an axial inner wall height and presents a contoured form such that the inner wall height varies circumferentially between maximum and minimum inner wall heights. Similarly, the outer wall 56 has an axial outer wall height and presents a contoured form such that the outer wall height varies circumferentially between maximum and minimum outer wall heights.

The arcuate positions of the minimum inner and outer wall heights preferably correspond to one another, as do the arcuate positions of the maximum inner and outer wall heights. That is, the inner and outer walls 54 and 56 are each at their maximum heights in radially aligned locations and are likewise each at their minimum heights in radially aligned locations.

Each wall 54 and 56 preferably includes two (2) minimum height locations and two (2) maximum height locations. Most preferably, the minimum height locations are diametrically opposed, as are the maximum height locations. Still further, the minimum and maximum height locations are preferably evenly arcuately spaced apart from each other.

Figure 5:
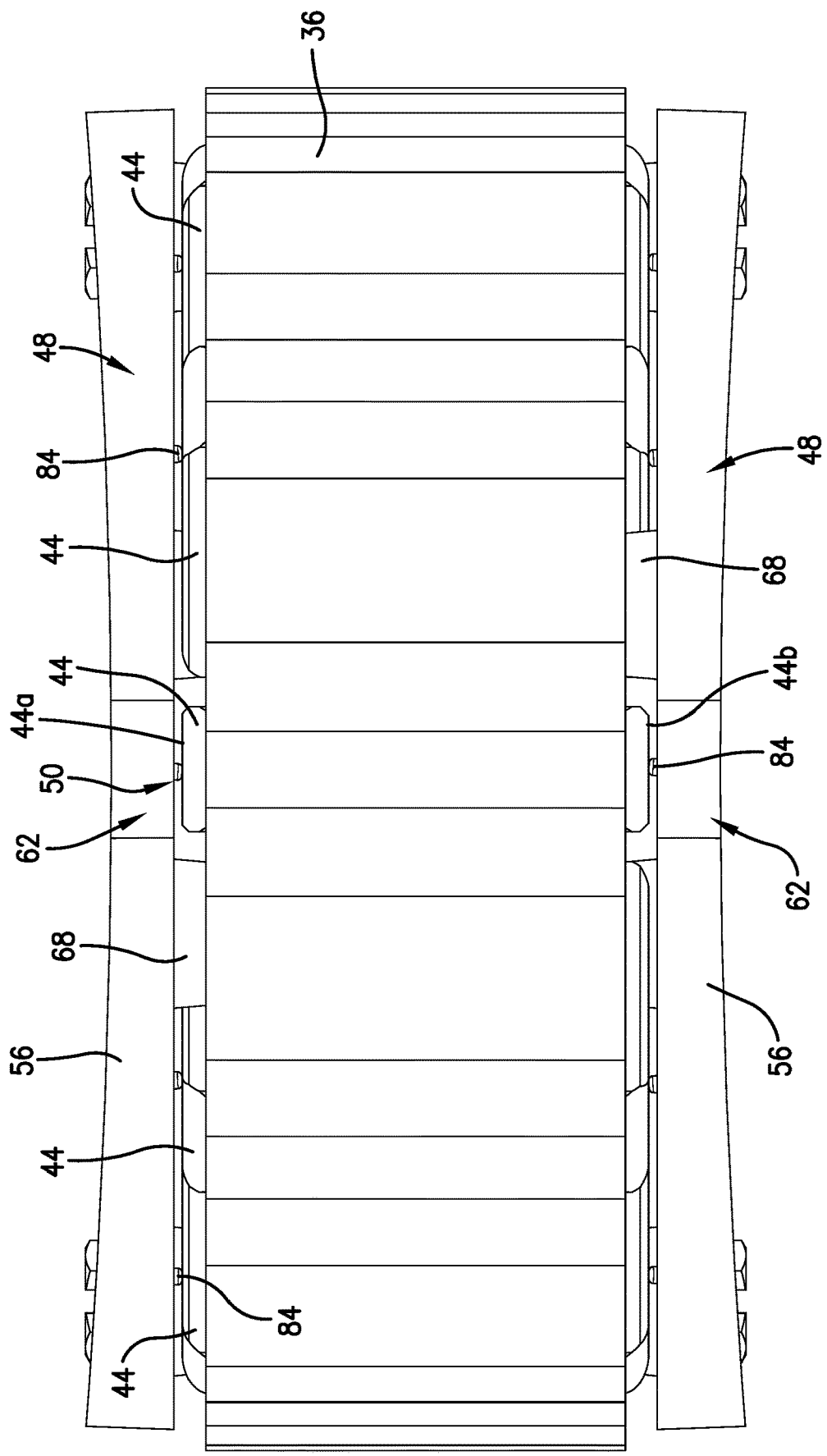
FIG. 5 is a side view, taken along line 5-5 of FIG. 4, of the portion of the rotor shown in FIG. 4.
Figure 6:
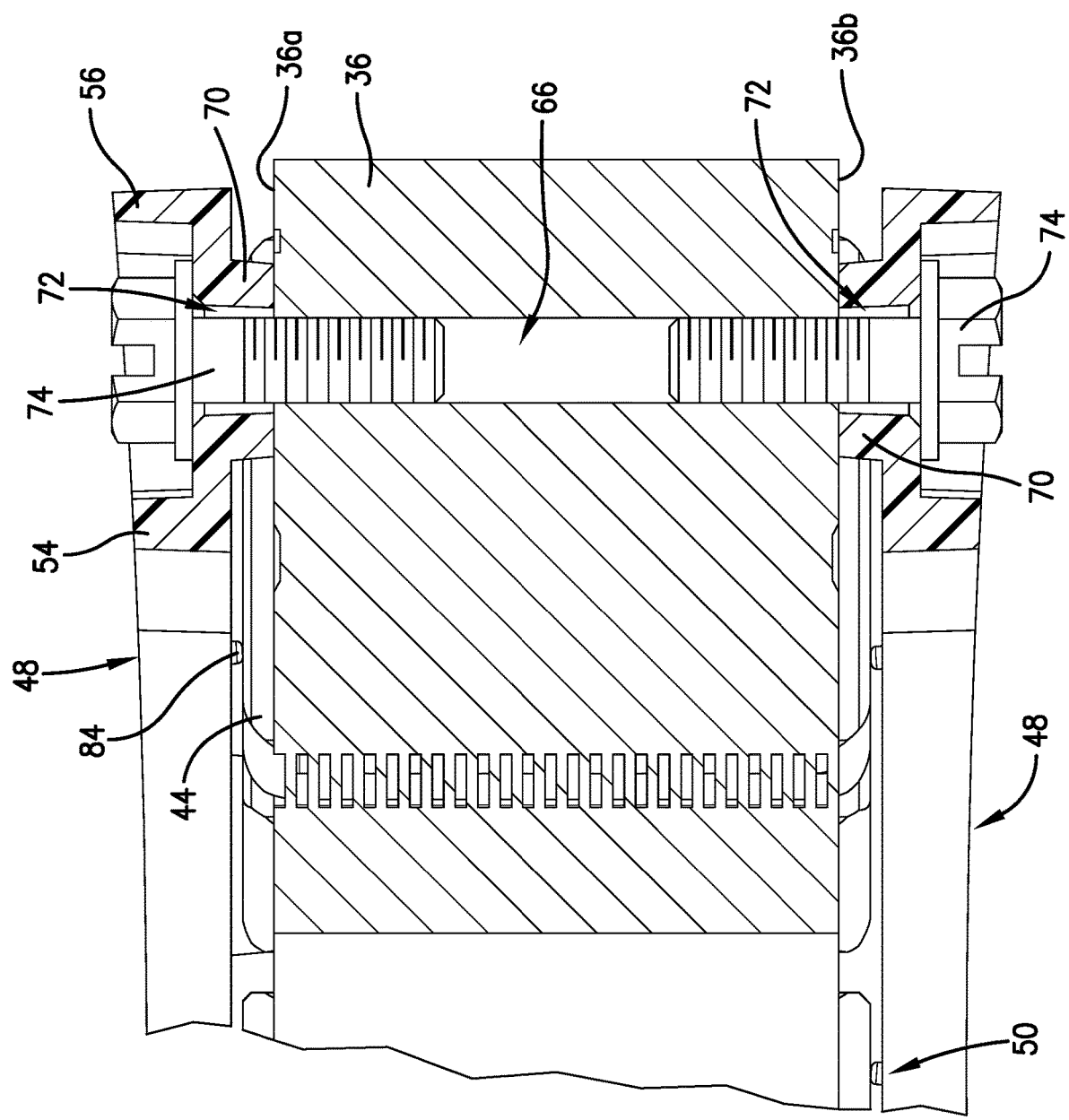
FIG. 6 is a fragmentary cross-sectional side view, taken along line 6-6 of FIG. 4, of a portion of the rotor of FIG. 4, particularly illustrating the interaction of fasteners and bosses with the rotor core.
Figure 7:
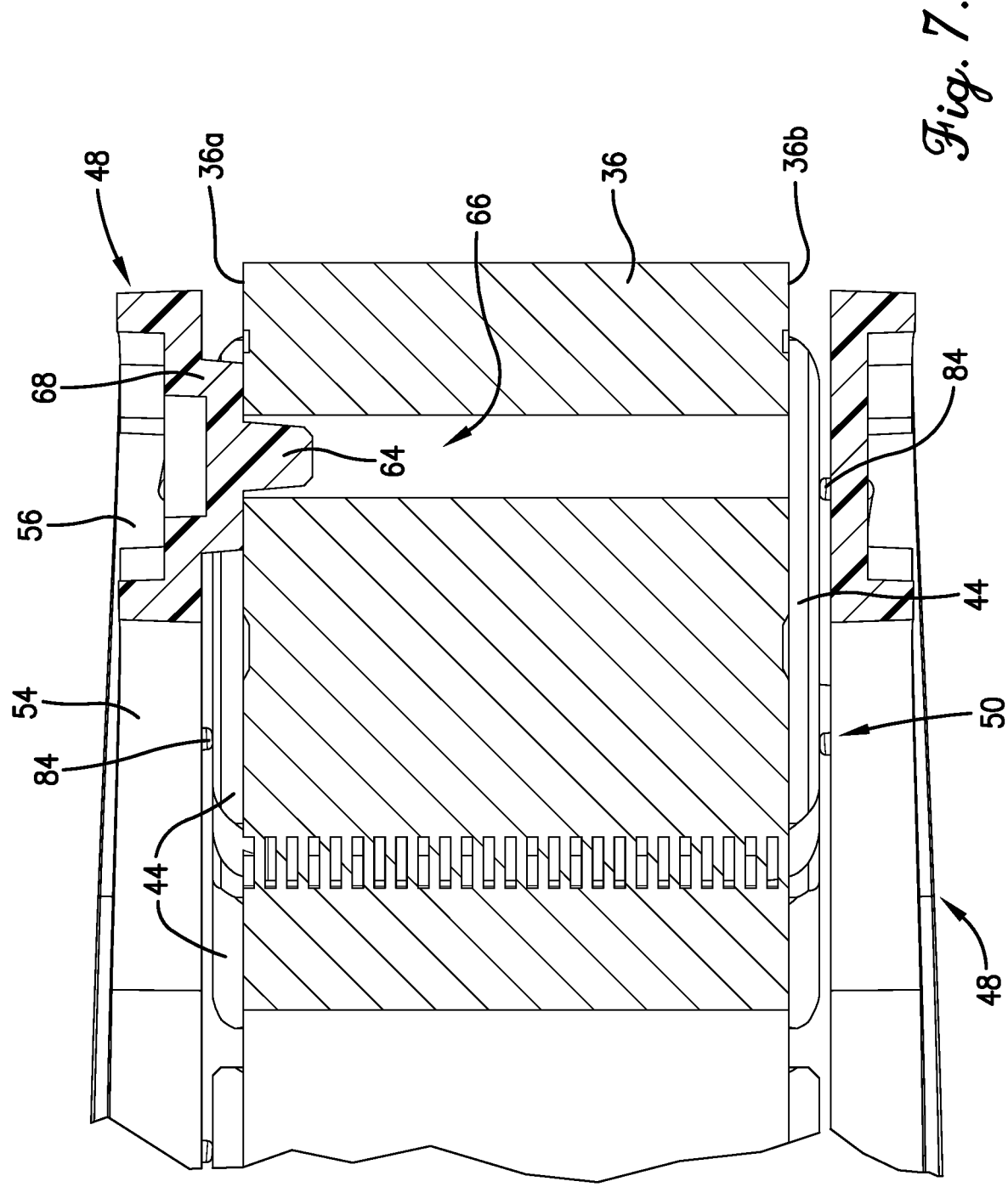
FIG. 7 is a fragmentary cross-sectional side view, taken along line 7-7 of FIG. 4, of a portion of the rotor of FIG. 4, particularly illustrating the interaction of pins and bosses with the rotor core.

As best shown in FIG. 5, the retention cap 48 presents an overall contoured shape as a result a result of the contouring of the walls 54 and 56. The functional significance of this contouring will be discussed in greater detail below.

The retention cap 48 also preferably includes at least one alignment element 58 for orienting the cap 48 relative to the core 36 and for orienting the caps 48 relative to each other. In the illustrated embodiment, a plurality of alignment elements 58 are provided and include both visual alignment elements and physical alignment elements.

The visual alignment elements preferably include two (2) pairs of alignment bars 60, a pair of notches 62, and a pair of pins 64 and corresponding openings 66.

More particularly, in a preferred embodiment, two pairs of diametrically opposed, radially extending alignment bars 60 project from the outer surface 52b and provide visual positioning guidance to facilitate proper clocking or rotation of the caps 48 relative to one another. In the illustrated embodiment, the bars 60 include two (2) diametrically opposed inner bars 60a extending from corresponding locations on the inner wall 54 and two (2) diametrically opposed outer bars 60b extending from corresponding locations on the outer wall 56. Each inner bar 60a is preferably disposed directly radially opposite a corresponding one of the outer bars 60b. It is permissible according to some aspects of the present invention, however, for the bars to be alternatively configured, present in varying numbers, or omitted entirely.

A notch 62, most preferably extending along an arc of a circle, is preferably formed in the body 52 and outer wall 56 adjacent each outer bar 60b, such that two (2) diametrically opposed notches 62 are provided. Such notches 62 are provided for additional alignment assistance but may be omitted without departing from the scope of some aspects of the present invention.

Although the bars 60 and notches 62 may be used to provide visual alignment assistance during manual assembly of the caps 48 onto the rotor core 36, such alignment elements 58 may also provide optical guidance during automated assembly or in a post-assembly verification process. That is, machine vision may be used for analysis of the visual alignment elements 58.

The physical alignment elements preferably include a pair of diametrically opposed alignment pin bosses 68 projecting axially from the inner surface 52a of the body 52 and a pair of alignment pins 64 projecting from respective ones of the pin bosses 68.

In a preferred embodiment, an axially extending opening 66 extends through each pole segment 44. The openings 66 both reduce core material and, in a preferred embodiment, facilitate holding of the rotor core 36 during tooling. Upon placement of the cap 48 onto the rotor core 36, each pin 64 is received in one of the axially extending openings 66.

It is permissible according to some aspects of the present invention for one or more of the openings to instead be defined by the body or another portion of the cap and for one or more of the pins to instead be defined by the core. However, the illustrated configuration, in which the pins extend from the body and into the core, is most preferred.

A pair of diametrically opposed fastener bosses 70 also project axially from the inner surface 52a of the body 52. The fastener bosses 70 each define a fastener-receiving opening or aperture 72. A corresponding fastener 74 extends through each aperture 72 (that is, through the body 52) and into the core 36 to secure the cap 48 to the core 36. The fasteners 74 are preferably screws 74. More particularly, the fasteners 74 are preferably self-tapping (that is, thread-forming) screws 74, although it is permissible according to some aspects of the present invention for other screw or fastener types to be used.

The fastener bosses 70 are preferably positioned arcuately intermediately between the alignment bars 60 and notches 62. Alternatively stated, the fastener bosses 70 alternate arcuately with and are evenly arcuately spaced from each set of alignment bars 60a, 60b and notches 62. However, uneven spacing falls within the scope of some aspects of the present invention.

As will be apparent from the above, the fastener bosses 70 also preferably alternate arcuately with the pin bosses 68.

In a preferred embodiment, as will be discussed in greater detail below, the maximum heights of the inner and outer walls 54 and 56, respectively, occur adjacent corresponding ones of the fasteners or screws 74 or, alternatively stated, adjacent the corresponding fastener bosses 70. In contrast, the minimum heights of the walls 54 and 56 occur at positions orthogonal to the fasteners or screws 74 and fastener bosses 70. That is, the minimum heights of the walls 54 and 56 occur radially adjacent corresponding ones of the alignment bars 60a, 60b and notches 62.

Inner and outer arcuate reliefs 76a and 76b are preferably provided in the inner and outer walls 54 and 56 adjacent the fastener-receiving apertures 72. Such reliefs 76a and 76b facilitate insertion of the screws 74 and, if necessary, any associated flange or head portions thereof. However, the reliefs might in some instances be omitted or alternatively configured.

As noted previously, each cap 48 preferably includes a resiliently deformable or deflectable magnet retention element 50 configured to restrict axial movement of the magnets 44 relative to the core 36.

Preferably, the magnet retention element 50 includes a plurality of resiliently deformable fingers 78. Alternatively described, the fingers 78 are resiliently deflectable or spring-like. As will be discussed in greater detail below, the resiliently deformable nature of the fingers 78 facilitates transmission thereby of a spring force to the associated magnets 44 and consequent reduction or prevention of magnet chatter.

Most preferably, each finger 78 corresponds to one of the magnets 44. Each magnet 44 likewise corresponds to one of the fingers 78. However, it is permissible according to some aspects of the present invention for the preferred one-to-one correspondence to vary (as noted previously with respect to the retention element generally).

In a preferred embodiment, the fingers 78 are distributed in oppositely oriented clockwise and counter-clockwise extending pairs. Other configurations fall within the scope of the present invention, however.

Each finger 78 preferably extends from the body 52 in a cantilevered manner. More particularly, the body 52 preferably defines a plurality of slots 80 extending generally circumferentially in keeping with the arcuate extension of the cap 48 and body 52 in a broad sense. The fingers 78 preferably extend from the body 52 and into corresponding ones of the slots 80.

In greater detail still, each finger 78 preferably includes main form 82 and a contact projection or nub 84 extending from the main form 82. The main form 82 includes a base 86 adjacent and extending from the body 52 and a tip 88 spaced from the base 86 and disposed in the corresponding slot 80. The nub 84 preferably extends axially from the main body 52 at or adjacent the tip 88, although alternative positioning falls within the scope of some aspects of the present invention.

In a preferred embodiment, each nub 84 is positioned arcuately centrally over a corresponding one of the magnets 44 of the rotor 14 to facilitate application of a retentive spring force thereto if the finger 78 is deflected. Such functionality will be discussed in greater detail below.

It is noted that each nub 84 is preferably rounded or frustoconical to facilitate secure contact with the associated one of the magnets 44. Alternative shapes fall within the scope of some aspects of the present invention, however.

The tip 88 is preferably free of direct interconnection with any structures of the cap 48 except for those of the finger 78 itself. That is, the tip 88 is connected to the base 86 by the main form 82 and has the nub 84 extending therefrom, but is otherwise devoid of contact with or connection to the cap 48. Those of ordinary skill in the art will recognize that the fingers 78 may therefore be understood to be cantilevered structures.

It is permissible according to some aspects of the present invention for the fingers to be non-cantilevered in form. For instance, the fingers might extend across the slots in their entirety or be connected to the body by one or more bridges. However, in such an embodiment, it would nevertheless be most preferred for the resiliently deformable or deflectable nature and functionality of the fingers be retained.

The slots 80 are preferably at least substantially rectangular but with slightly curved inner and outer sides in keeping with the aforementioned circumferential extension thereof, although other shapes and extension directions (for instance, fully rectangular shape and tangential extent) fall within the scope of some aspects of the present invention. Likewise, the fingers 78 preferably extend slightly arcuately, although straight fingers fall within the scope of the present invention.

Each finger 78 is preferably disposed radially centrally within the corresponding slot 80, although offset configurations fall within the ambit of some aspects of the present invention.

It is also permissible according to some aspects of the present invention for one or more of the fingers to extend radially inwardly or outwardly from the body into the corresponding slot. The slots might also vary from the preferred circumferential extension.

Each finger 78 preferably has an arcuate length between the base 86 and the tip 88 thereof that is slightly greater than half the arcuate length of the corresponding slot 80. Variations in length proportion are permissible according to some aspects of the present invention, however.

The base 86 is preferably broader (that is, has a greater radial dimension) than the tip 88, such that the finger 78 tapers from the base 86 to the tip 88. Alternatively described, each finger 78 is preferably generally triangular in form, with a rounded vertex at the tip 88 thereof. In a preferred embodiment, the base 86 presents a base width that is at least one and one half (1 ½) times the tip width. However, shape and proportion variations of the fingers fall within the scope of some aspects of the present invention.

Each finger 78 and, in particular, the base 86 thereof, is preferably shaped so as to reduce or eliminate sharp corners or other irregularities or features that might be associated with stress concentrations. In the illustrated embodiment, for instance, curved stress-relief transition regions 90 are provided at the interface of each base 86 with the body 52. The broad, smooth-edged base 86 is thereby configured to efficiently absorb and distribute bending loads, rather than such loads resulting in distortion of the body 52 or causing irregular, high, and/or potentially damaging stresses in the finger 78.

It is permissible according to some aspects of the present invention, however, for the fingers to be generally straight-sided or rectangular and/or for the fingers to be devoid of stress-relief transition regions.

The magnet retention cap 48 preferably comprises synthetic resin, although any one or more of a variety or materials or combinations of materials may be suitable, provided detrimental effects on motor performance or cost fall within acceptable limits or do not occur. It is particularly noted that the use of synthetic resin, as preferred, enables the cap 48 to be low in weight and therefore not associated with any substantive resulting motor balancing issues. Use of a synthetic resin also enables the cap 48 to be both magnetically and electrically insulative.

Most preferably, the magnet retention cap 48 comprises Nylon 66 glass filled (PA66-GA33). Stamped metal might also be used, although insulation (in the form of a Mylar® sheet, for instance) might preferably be added to eliminate or reduce untoward effects on flux.

In a preferred embodiment, the cap 48 is readily suited for use with a variety of rotor core inner diameters, such as one half (½) inch, seventeen (17) millimeter, five eighths (⅝) inch, and twenty-five (25) millimeter, without any modifications. Furthermore, the cap 48 can be easily redesigned (that is, resized) to accommodate other inner diameters as necessary. Adaptation for other outer diameters is similarly straightforward.

Certain relative or proportional dimensions of components of the cap 48 and of the cap 48 relative to the associated rotor core 36, however, are preferably generally consistent among retention caps regardless of the overall size of the given cap. For instance, relative inner and outer diameters of the cap 48 relative to the associated rotor core 36 have been discussed above. Furthermore, relative dimensions of components of the magnet retention element 50 are preferably chosen for stress reduction purposes as pertain to the cap 48 itself and for adequate force application as pertains to the fingers 78 relative to the magnets 44. For instance, it will generally be preferred that the radial widths of the bases 86 of the fingers 78 are at least one and twenty-five hundredths (1.25) times the radial widths of the tips 88 thereof, more preferably at least one and five tenths (1.5) times the widths of the tips 88 thereof, and most preferably about two (2) times the widths of the tips 88 thereof.

Assembly of Rotor and Function of Magnet Retention Caps

In a preferred method of assembly, the rotor core 36 is initially hot dropped onto the shaft 38. The magnets 44, which have been pre-magnetized, are then pressed into the core 36 via an automated process. A first magnet retention cap 48 is positioned on a first axial end face 36a of the core 36 and secured thereto, and a second magnet retention cap 48 is positioned on a second axial end face 36b of the core 36 and secured thereto. The bearing assemblies 46 may then be added axially outwardly from respective ones of the magnet retention caps 48.

In greater detail, after the magnets 44 have been inserted into the slots 42 of the rotor core 36, the first cap 48 is positioned such that the alignment pins 64 extend into a corresponding first pair of the pole segment openings 66, such that and the fastener bosses 70 and pin bosses 68 are in overlying engagement with (or nearly in overlying engagement with) the first axial end face 36a of the rotor core 36.

The screws 74 are then inserted through respective ones of the fastener-receiving openings or apertures 72 defined by the fastener bosses 70 (that is, through the body 52 of the cap 48) and into a second pair of pole segment openings 66 that are offset from the first pair of pole-segment openings 66. As noted previously, the screws 74 are preferably self-tapping, such that insertion of the screws 74 into the second pair of pole-segment openings 66 generates complementary threads in the core 36 and facilitates a robust connection between the cap 48 and the core 36.

Furthermore, tightening of the screws 74 results in bearing down of the pin bosses 68 and fastener bosses 70 against the rotor core 36, such that engagement of the bosses 68 and 70 with the rotor core 36 is ensured.

As shown in FIGS. 5-8, the bosses 68 and 70 function as standoffs, spacing the body 52 of the cap 48 from the rotor core 36 and the magnet 44. The bosses 68 and 70 thus facilitate a reduced lamination count and ensure the cap 48 is tightened into engagement with the end face 36a of the core 36.

It is noted that, if no bosses 68 and 70 were provided, the screws 74 might detrimentally cause delamination (or separation of the rotor core laminations) upon tightening. This might be manifested by peeling up of the endmost ones of the laminations.

As a result of the positioning of the bosses 68 and 70 securely against the first end face 36a, the main forms 82 of the fingers 78 are spaced from the corresponding ones of the magnets 44, but the projections or nubs 84 of the fingers 78 either nearly engage or do engage the corresponding magnets 44. More particularly, each magnet 44 presents axially opposed end faces 44a and 44b. The nubs 84 associated with the first retention cap 48 either nearly engage or engage the first magnet end faces 44a.

If a given nub 84 engages the corresponding magnet 44 in such a manner as to result in deflection of the main form 82 of the associated finger 78, the finger 78 will provide a spring force (alternatively, a resistive, restrictive, oppositional, or corrective force) against the magnet 44 that acts against an axially outward shifting of the magnet 44. That is, the spring force resists shifting of the magnet 44 toward the associated finger 78.

Whether or not a given nub 84 actually engages or only nearly engages the corresponding magnet depends on factors such as the actual axial heights of the rotor core 36 and magnets 44 (as opposed to the nominal or specified heights, thereof, for instance) and the positioning of the magnets 44 within the corresponding slots 42 (for instance, axially centered or shifted axially in one direction or the other).

Figure 8:
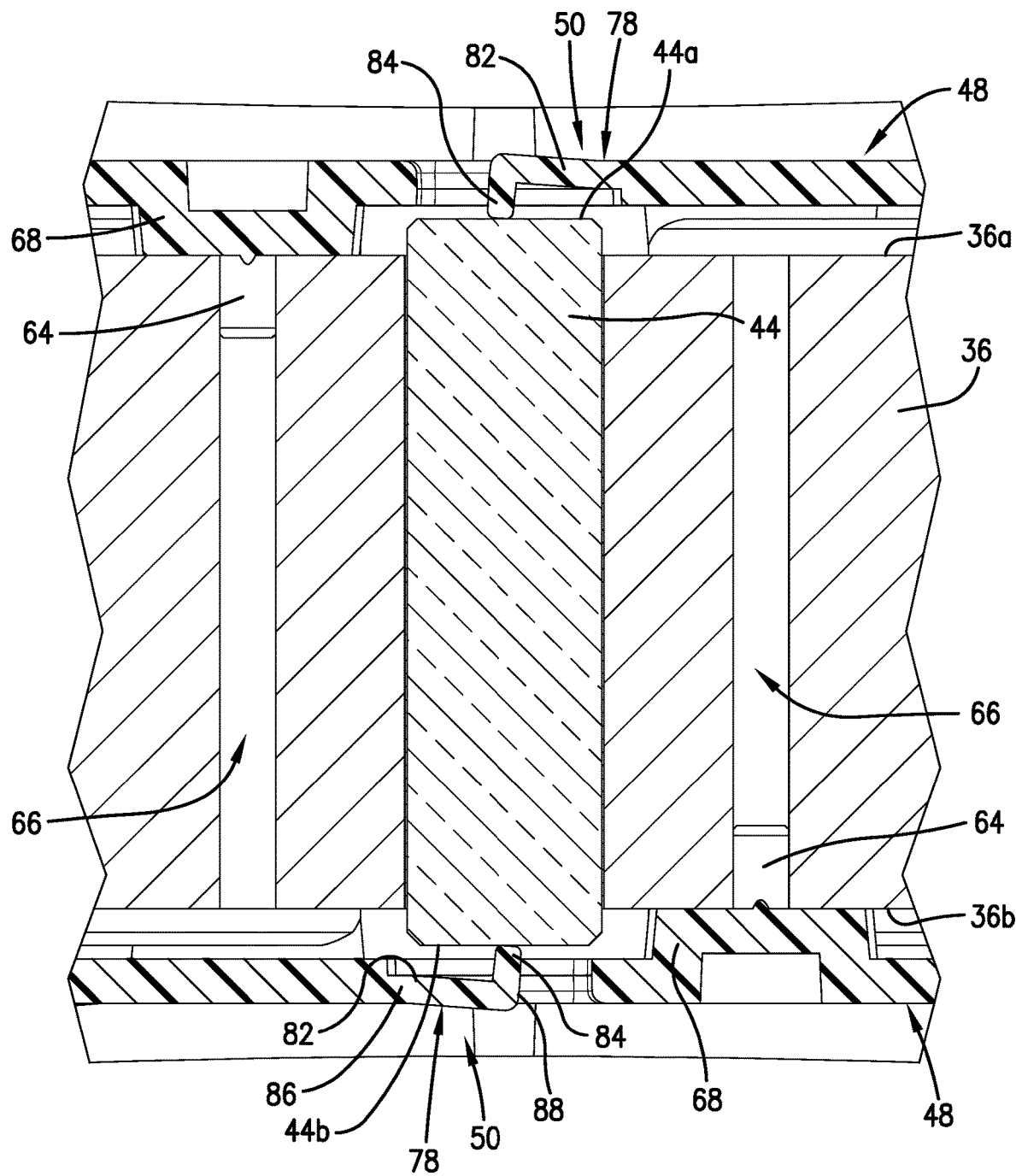
FIG. 8 is a fragmentary cross-sectional side view, taken along line 8-8 of FIG. 4, of a portion of the rotor of FIG. 4, particularly illustrating interaction of bosses and magnet retention fingers with the rotor core and a magnet, respectively.

Regardless of whether or not initial contact is made after assembly, the fingers 78 and the cap 48 more broadly are configured such that sufficient subsequent axial shifting or chatter of a given magnet 44 will ultimately result in engagement thereof by a corresponding nub 84 (if engagement has not initially occurred), with further shifting in the direction of the nub 84 resulting in commencement of or further deflection of the finger 78 and consequent application of or increases to a resistive force to the magnet 44. In FIG. 8, for instance, a pair of fingers 78 are illustrated in a deflected configuration, with the nubs 84 thereof in contact with respective end faces 44a and 44b of a given magnet 44.

In a preferred embodiment, retentive forces ranging from three (3) lb to five and one half (5.5) lb may be provided by each finger 78. However, nominal values of the retentive forces may vary without departing from the scope of some aspects of the present invention.

As noted previously, each retention cap 48 presents a contoured shape as a result of the circumferentially varying height of each of the inner and outer walls 54 and 56. As also noted previously, the greatest heights of the walls 54 and 56 are adjacent the fasteners 74. Such configuration helps minimize deflection of the body 52 and walls 54 and 56 of the cap 48 in order to maximize the force applied by the fingers 78 of the magnet retention element 50.

More particularly, contouring of each cap 48 as described above helps transfer loads toward the fasteners or screws 74, minimizing deflection of the remainder of the cap 48 and in turn maximizing the ability of the magnet retention element 50 and, more particularly the fingers 78 thereof, to apply retentive forces to the associated magnets 44. That is, deformation of a given finger 78 through contact with a magnet 44 results in a force being applied by the magnet 44 to the finger 78 and vice versa. The force applied to the finger 78 is transferred to the retention cap 48 in a broad sense, urging it deform to some extent. By merit of the contoured arch shape of the walls 54 and 56 described above, however, any such force is transferred from thinner (shorter) areas of the cap 48 and, particularly, of the walls 54 and 56, toward thicker (taller) areas adjacent the screws 74. That is, loads received by the retention cap 48 are, by merit of the contoured shape thereof, transferred to portions of the cap 48 best able to absorb such loads with minimal deflection. As will be readily understood by those of ordinary skill in the art, if the cap were not contoured, forces would not be directed optimally and deflection of the body of the cap would potentially increase. The resistive forces of the spring fingers as applied to the magnets would therefore detrimentally decrease.

It is noted that the design of the cap 48, including the contouring thereof, also enables the number of fasteners 74 to be reduced to exactly two (2). Absent contouring and the associated transfer of forces toward the existing fasteners, additional fasters might be needed to restrict undesirable deflection.

The second cap 48 is preferably installed such that it engages the second end face 36b of the core 36 and potentially the second end faces 44b of the magnets 44 in a similar manner to that described above for the first cap 48.

Preferably, the second cap 48 is installed so as to align arcuately with the first cap 48, as visually aided by the bars 60 and notches 62 and as physically aided by receipt of the alignment pins 64 in openings 66. Correct alignment is advantageous for motor balancing, although misaligned rotors fall within the scope of some aspects of the present invention.

In a preferred method of assembly, the caps 48 are installed fully automatically, with machine vision using the various visual alignment elements 58 to confirm correct rotational alignment or clocking of the first and second caps 48 relative to one another. Fully manual, fully automated, and/or other combined manual/automated assembly methods all fall within the scope of the present invention, however.

Discussion of Selected Advantages

The present magnet retention cap design and rotor assembly method present numerous advantages, including but not limited to those already elucidated above.

For instance, in contrast to an overmolded design in which magnetization occurs after assembly, the present invention facilitates pre-magnetization of the magnets 44.

Furthermore, contact with the magnets 44 via the projections or nubs 84 of the fingers 78, rather than by the main forms 82 thereof, enables continuous contact to be achieved with less risk of associated forces causing bending of the entire magnet retention cap 48. For instance, provision of axially thicker fingers or main bodies that are themselves in direct contact with the magnets might result in bending of the magnet retention cap in a general sense.

In addition, the contoured shape of the cap 48 helps reduce part deflection once installed and facilitates relatively stable retention forces to be applied by various ones of the fingers 78.

The contoured shape also enables fixation by means of only two (2) diametrically opposed fasteners 74.

Still further, the tapered shaping of the fingers 78 is such that maximum stresses at maximum deflection are concentrated at the respective bases 86 of the fingers 78.

The retention caps 48 used on both ends of the rotor core 36 are also identical, reducing part count and eliminating potential errors that might otherwise be associated with asymmetrical assembly requirements.

Still further, the inventive retention caps 48 may be used with rotors of varying stack heights and magnet lengths.

Provision of a flexible magnet retention element 50 also enables accommodation of variations in rotor length, even within a given rotor, resulting from tolerance stack-up issues and so on. That is, the present end cap 48 is designed to readily facilitate minimum and maximum manufactured dimensions and is generally not affected by so-called "fluffy" or "spongy" cores in which laminations are spaced apart somewhat but interlocked.

As noted previously, the illustrated caps 48 work with a variety of rotor core inner and outer diameters and can be easily redesigned to accommodate other inner and outer diameters as necessary.

The caps 48 may also be used with both fully and semi-processed rotor lam steel and are unaffected by different lam thicknesses. Solid cores are also broadly compatible with the caps 48.

The magnet retention caps 48 also provide secondary retention of rotor core laminations, should delamination occur.

The caps 48 also provide aesthetically pleasing and effective physical barrier protection to protruded magnets 44 against metal particles or debris, are cost effective, and are lightweight so as to minimize additional loads on the bearing assemblies 46.

The light weight of the caps 48 also ensures that any contribution to unbalance issues that might occur, particularly in high-speed applications, is minimal.

The caps 48 may be easily and cost-effectively manufactured via a molding process, eliminating costly machining.

Finally, provision of readily removable, re-installable, and replaceable end caps 48 facilitates rework of existing rotors already fitted with the caps 48 but in need of modification, as well as retrofitting of existing rotors not yet featuring the caps 48.

Conclusion

The preferred forms of the invention described above are to be used as illustration only and should not be utilized in a limiting sense in interpreting the scope of the present invention. Obvious modifications to the exemplary embodiments, as hereinabove set forth, could be readily made by those skilled in the art without departing from the spirit of the present invention.

Although the above description presents features of preferred embodiments of the present invention, other preferred embodiments may also be created in keeping with the principles of the invention. Furthermore, as noted previously, these other preferred embodiments may in some instances be realized through a combination of features compatible for use together despite having been presented independently as part of separate embodiments in the above description.

The inventors hereby state their intent to rely on the Doctrine of Equivalents to determine and access the reasonably fair scope of the present invention as pertains to any apparatus not materially departing from but outside the literal scope of the invention set forth in the following claims.

What is claimed is:

1. A rotor for an electric motor, said rotor comprising:
a core rotatable about an axis and defining a plurality of magnet-receiving slots;
a plurality of magnets, each of said magnets being received in a respective one of said magnet-receiving slots; and
a magnet retention cap fixed relative to said core and including a resiliently deformable magnet retention element configured to restrict axial movement of the magnets relative to the core,
said magnet retention element including a plurality of resiliently deflectable fingers,
each of said fingers corresponding to one of said magnets,
said cap further including a body,
each of said fingers extending from said body in a cantilevered manner,
each of said fingers including a base extending from the body and a tip spaced from the base,
said base being broader than said tip such that said finger tapers from the base to the tip.

2. The rotor of claim 1,
said base presenting a base width,
said tip presenting a tip width,
said base width being at least one and one half times said tip width.

3. The rotor of claim 1,
said body defining a plurality of slots,
each of said fingers extending into a corresponding one of said slots.

4. The rotor of claim 1,
said body being spaced from the core and the magnets.

5. A rotor for an electric motor, said rotor comprising:
a core rotatable about an axis and defining a plurality of magnet-receiving slots;
a plurality of magnets, each of said magnets being received in a respective one of said magnet-receiving slots; and
a magnet retention cap fixed relative to said core and including a resiliently deformable magnet retention element configured to restrict axial movement of the magnets relative to the core,
said magnet retention element including a plurality of resiliently deflectable fingers,
each of said fingers corresponding to one of said magnets,
said cap further including a body,
each of said fingers extending from said body in a cantilevered manner,
each of said fingers including a main form and a nub extending from the main form,
said main form being spaced from the corresponding one of the magnets and including a base extending from the body and a tip spaced from the base,
said nub configured to engage a corresponding one of the magnets.

6. The rotor of claim 5,
said nub extending from said main form adjacent the tip.

7. The rotor of claim 5,
said body being spaced from the core and the magnets.

8. The rotor of claim 7,
said cap including a boss extending from the body and engaging the core.

9. A rotor for an electric motor, said rotor comprising:
a core rotatable about an axis and defining a plurality of magnet-receiving slots;
a plurality of magnets, each of said magnets being received in a respective one of said magnet-receiving slots; and
a magnet retention cap fixed relative to said core and including a resiliently deformable magnet retention element configured to restrict axial movement of the magnets relative to the core,
said cap further including a body,
said magnet retention element extending from said body,
said body being spaced from the core and the magnets,
said cap including a boss extending from the body and engaging the core,
said cap including a plurality of said bosses,
said bosses being arcuately spaced apart along the body and each engaging the core.

10. The rotor of claim 9, said magnet retention element including a plurality of resiliently deflectable fingers, each of said fingers corresponding to one of said magnets.

11. The rotor of claim 10,
each of said fingers extending from said body in a cantilevered manner.

12. The rotor of claim 9,
one of said core and said cap defining an axially extending opening,
the other of said core and said cap defining an alignment element projecting into said opening to orient the cap relative to the core.

13. A rotor for an electric motor, said rotor comprising:
a core rotatable about an axis and defining a plurality of magnet-receiving slots;
a plurality of magnets, each of said magnets being received in a respective one of said magnet-receiving slots; and
a magnet retention cap fixed relative to said core and including a resiliently deformable magnet retention element configured to restrict axial movement of the magnets relative to the core,
said cap further including a body and a boss extending from the body,
said boss defining an aperture; and
a fastener extending through said aperture and into the core to secure the cap to the core and the boss against the core.

14. The rotor of claim 13,
said magnet retention element including a plurality of resiliently deflectable fingers,
each of said fingers corresponding to one of said magnets.

15. A rotor for an electric motor, said rotor comprising:
a core rotatable about an axis and defining a plurality of magnet-receiving slots;
a plurality of magnets, each of said magnets being received in a respective one of said magnet-receiving slots; and
a magnet retention cap fixed relative to said core and including a resiliently deformable magnet retention element configured to restrict axial movement of the magnets relative to the core,
said cap including a radially and circumferentially extending body and a circumferentially extending wall projecting from the body axially away from the core,
said wall having an axial wall height and presenting a contoured form such that the wall height varies circumferentially between maximum and minimum wall heights.

16. The rotor of claim 15,
said cap further including a second circumferentially extending wall projecting from the body axially away from the core,
said second wall being spaced radially from the first-mentioned wall,
said second wall having an axial second wall height and presenting a contoured form such that the second wall height varies circumferentially between maximum and minimum second wall heights, in correspondence with variations in the first-mentioned wall height.

17. The rotor of claim 15,
said rotor including a fastener extending through the body and into the core to secure the cap to the core,
said wall height being the maximum height adjacent the fastener.

18. The rotor of claim 17,
said rotor including exactly two of said fasteners,
each of said fasteners extending through the body and into the core,
said fasteners being diametrically opposed,
said wall height being the maximum height adjacent each of the fasteners.

19. The rotor of claim 17,
said cap further including a boss extending from the body and engaging the core such that the body is spaced from the core and the magnets,
said boss defining an aperture,
said fastener extending through said aperture and into the core to secure the cap to the core and the boss against the core.

20. The rotor of claim 15,
said magnet retention element including a plurality of resiliently deflectable fingers,
each of said fingers corresponding to one of said magnets.

\* \* \* \* \*